United States Patent
Khan et al.

(10) Patent No.: US 12,116,515 B1
(45) Date of Patent: Oct. 15, 2024

(54) METHOD FOR SYNTHESIZING CARBON QUANTUM DOTS FROM MACROALGAE

(71) Applicant: KING FAHD UNIVERSITY OF PETROLEUM AND MINERALS, Dhahran (SA)

(72) Inventors: Firoz Khan, Dhahran (SA); Masoud Al-Rasheidi, Dhahran (SA); Mazen Khaled Nazal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/746,719

(22) Filed: Jun. 18, 2024

(51) Int. Cl.
  *C09K 11/65* (2006.01)
  *B82Y 20/00* (2011.01)
  *B82Y 40/00* (2011.01)
  *C01B 32/15* (2017.01)

(52) U.S. Cl.
  CPC .............. *C09K 11/65* (2013.01); *C01B 32/15* (2017.08); *B82Y 20/00* (2013.01); *B82Y 40/00* (2013.01); *C01P 2002/82* (2013.01); *C01P 2002/84* (2013.01); *C01P 2002/85* (2013.01); *C01P 2004/03* (2013.01); *C01P 2004/04* (2013.01); *C01P 2004/30* (2013.01); *C01P 2004/38* (2013.01); *C01P 2004/64* (2013.01); *C01P 2006/60* (2013.01)

(58) Field of Classification Search
  CPC ..... C09K 11/65; C01B 32/15; C01P 2004/38; C01P 2004/64; C01P 2004/30; C01P 2006/60
  See application file for complete search history.

(56) References Cited

FOREIGN PATENT DOCUMENTS

| CN | 106892419 A | | 6/2017 |
|---|---|---|---|
| CN | 111439742 A | | 7/2020 |
| CN | 114736676 A | * | 7/2022 |
| CN | 114736676 B | | 2/2023 |
| CN | 117228929 A | | 12/2023 |
| KR | 10-1405000 | | 6/2014 |

OTHER PUBLICATIONS

Li et al.; Chlorine Modulation Fluorescent Performance of Seaweed-Derived Graphene Quantum Dots for Long-Wavelength Excitation Cell-Imaging Application; MDPI molecules; Aug. 18, 2021; 8 Pages.

Singh et al.; Green, economical synthesis of nitrogen enriched carbon nanoparticles from seaweed extract and their application as invisible ink and fluorescent film; Materials Letters, vol. 309; Feb. 15, 2022; 4 Pages.

* cited by examiner

*Primary Examiner* — C Melissa Koslow
(74) *Attorney, Agent, or Firm* — Oblon, McClelland, Maier & Neustadt, L.L.P.

(57) ABSTRACT

A method for synthesizing carbon quantum dots (CQDs) including reacting a mixture of macroalgae and ethanol hydrothermally in an autoclave at a reaction temperature between 150 degrees Celsius (° C.) and 250° C. to form a suspension. The method further includes separating the CQDs from the suspension. The CQDs have a size of 1 to 5 nanometers (nm). The CQDs have a Stokes shift of at least 80 nm at an excitation wavelength of 270-410 nm.

15 Claims, 12 Drawing Sheets

METHOD FOR SYNTHESIZING CARBON QUANTUM DOTS FROM MACROALGAE

STATEMENT OF ACKNOWLEDGEMENT

The inventors acknowledge the support provided by the Interdisciplinary Research Center for Renewable Energy and Power Systems, King Fahd University of Petroleum and Minerals, Saudi Arabia, through project INRE2308.

CROSS REFERENCE TO RELATED APPLICATION

The present disclosure claims the benefit of Saudi Patent Application No. 1020242895 filed on May 27, 2024, with the Saudi Authority for Intellectual Property Office, which is incorporated herein by reference in its entirety.

BACKGROUND

Technical Field

The present disclosure is directed to carbon quantum dots (CQDs) and, more particularly, to a method for synthesizing CQDs from macroalgae.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Due to exceptional optoelectrical properties, carbon quantum dots (CQDs) have gained substantial consideration for their potential uses in various fields, like bioimaging, catalytic activity, sensors, solar cells, etc. Further, CQDs are water-soluble, low-cost, non-toxic, and chemically stable. However, due to the absence of a suitable bandgap in the CQDs, it is difficult for a macroscopic sample of the carbon-based materials to work as an efficient fluorescent material. The applications of CQDs can be widened by improving their luminescent properties.

Photoluminescence (PL) quantum yield (PLQY) and Stokes shift (SS) are important luminescence properties that play a role in improving the performance of solar cells and light-emitting diodes (LED). Typically, the values of PLQY and SS may be improved by doping pure CQDs with heteroatoms such as B, N, S, and P.

Several methods, including laser ablation, polymerization, arc discharge, biomass, chemical oxidation, ultrasonication, solvothermal, and thermal, have been used to produce CQDs. CQDs typically have a spherical shape and are created using "bottom-up" techniques that include small molecule assembling, polymer/biomass assembly, polymerization, crosslinking, and subsequent carbonization processes such as combustion and thermal treatment. Biomass-derived CQDs are the most promising due to their environmental friendliness and economic effectiveness. Although spontaneous doping of heteroatoms is possible, doping with unwanted elements can limit the use and effectiveness of the CQDs. Thus, additional doping can be used to improve the performance of the CQDs. The optoelectrical properties can be tuned by controlling the synthesis parameters or dopant content.

Although several methods have been developed in the past, there still exists a need for an easy and cost-effective method of preparation of CQDs that may circumvent the drawbacks of the prior art. It is an object of the present disclosure to provide a method of making CQDs from biomass and the CQDs made therefrom.

SUMMARY

In an exemplary embodiment, a method for synthesizing carbon quantum dots (CQDs) is described. The method includes reacting a mixture of macroalgae and ethanol hydrothermally in an autoclave at a reaction temperature in a range of 150 degrees Celsius (° C.) to 250° C. to form a suspension. The method further includes separating the carbon quantum dots from the suspension, the carbon quantum dots have a size of 1 to 5 nanometers (nm). The CQDs have a Stokes shift of at least 80 nm at an excitation wavelength of 270-410 nm.

In some embodiments, the method incudes reacting the mixture of macroalgae and ethanol for at least 12 hours.

In some embodiments, the method further includes drying the macroalgae at a temperature of 50-100° C. prior to the reacting.

In some embodiments, the macroalgae is red algae, brown algae, or green algae.

In some embodiments, the CQDs have hydroxyl groups on a surface.

In some embodiments, the CQDs have a size of 2-3 nm.

In some embodiments, the CQDs include 50-60 weight percentage (wt. %) C, 15-25 wt. % Si, 5-15 wt. % Cl, 5-15 wt. %, 5-15 wt. % K, and 1-5 wt. % Na, based on a total weight of the CQDs.

In some embodiments, the CQDs have an optical bandgap of 2.5-3.0 electron volts (eV).

In some embodiments, the CQDs have a polygonal shape.

In some embodiments, the CQDs have a cubic shape.

In some embodiments, the CQDs are on a substrate.

In some embodiments, the CQDs are aggregated on the substrate, and the CQDs have a height of 0.1-1.0 nm on the substrate.

In some embodiments, the CQDs have a UV-visible absorption signal in a 250 to 500 nm wavelength range.

In some embodiments, the UV-visible absorption signal includes a first peak from 290 to 320 nm, a second peak from 250 to 400 nm, a third peak from 290 to 430 nm, and a fourth peak from 375-500 nm in a deconvoluted spectrum.

In some embodiments, the CQDs have a photoluminescence (PL) signal in a 350 to 740 nm wavelength range at an excitation wavelength of 270 to 410 nm.

In some embodiments, the PL signal comprises a first peak, a second peak, and a third peak.

In some embodiments, the first peak shifts 40-50 nm following excitation at 410 nm compared to excitation at 270 nm. A position of the second peak and the third peak remains at a constant position following excitation at 410 nm compared to excitation at 270 nm, and the CQDs have surface defects.

In some embodiments, the first peak has a stokes shift of 80-180 nm following excitation at 270 to 410 nm, the second peak has a stokes shift of 180-331 nm following excitation at 270 to 410 nm, and the third peak has a stokes shift of 240-390 nm following excitation at 270 to 410 nm.

In some embodiments, the PL signal includes a first peak from 425 to 475 nm, a second peak from 350-740 nm, third peak from 500 to 580 nm, a fourth peak from 525 to 600 nm, a fifth peak from 550-650 nm, and a sixth peak from 620-700 nm in a deconvoluted spectrum.

In some embodiments, the second peak has an area at least 10 times larger than the first, third, fourth, fifth, and sixth peaks.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
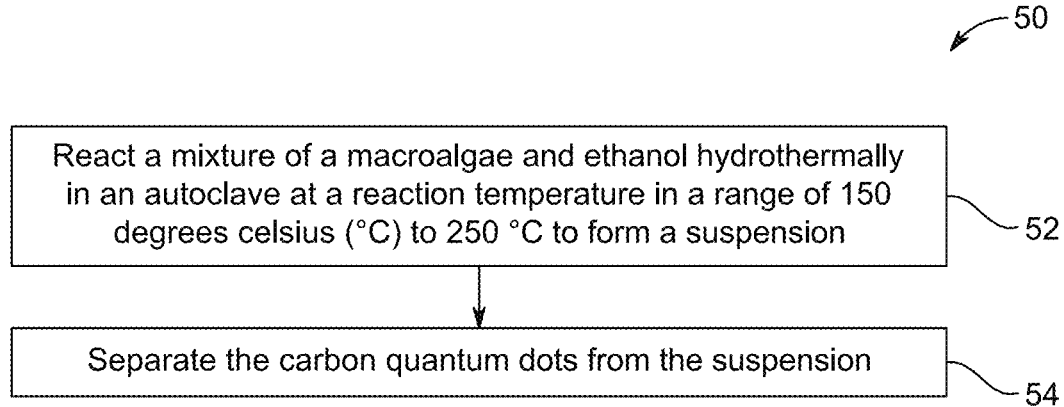
FIG. 1A is a schematic flow chart of a method for synthesizing carbon quantum dots (CQDs), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "quantum dots" are semiconductor particles less than 100 nm in size having optical and electronic properties that differ from those of larger particles as a result of quantum mechanical effects.

As used herein, the term "photoluminescence" (PL) occurs when absorption of light energy, or photons (electromagnetic radiation), stimulates the emission of a photon. Photoluminescence is light emission from any form of matter after the absorption of photons. It is a form of luminescence (light emission) and is initiated by photoexcitation (i.e., photons that excite electrons to a higher energy level in an atom). Following excitation, various relaxation processes occur in which other photons may be re-radiated. Time periods between absorption and emission may vary. Photoluminescence may take on forms such as fluorescence, phosphorescence, and chemiluminescence.

As used herein, the term, "photoluminescence quantum yield (PLQY)" is the number of photons emitted as a fraction of the number of photons absorbed.

As used herein, the term "Stokes shift" refers to the difference (in energy, wavenumber, or frequency units) between positions of the band maxima of the absorption and emission spectra (fluorescence and Raman being two examples) of the same electronic transition. When a system (be it a molecule or atom) absorbs a photon, it gains energy and enters an excited state. One way for the system to relax is to emit a photon through photoluminescence. When the emitted photon has less energy than the absorbed photon, this energy difference is the Stokes shift. The Stokes shift is primarily the result of two phenomena: vibrational relaxation or dissipation and solvent reorganization.

Aspects of the present disclosure are directed toward a method for synthesizing carbon quantum dots (CQDs) from macroalgae. The applicability of the synthesized CQDs as photon downconverters/downshifters in photovoltaics (PVs) is evaluated. The results indicate that the Stokes shift is enhanced.

FIG. 1A illustrates a schematic flow chart of a method 50 of making for synthesizing carbon quantum dots (CQDs) from macroalgae. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes reacting a mixture of macroalgae and ethanol hydrothermally in an autoclave at a reaction temperature of about 150° C., about 160° C., about 170° C., about 180° C., about 190° C., about 200° C., about 210° C., about 220° C., 230° C., 240° C., or about 250° C. to form a carbon quantum dot (CQDs) containing suspension. In an embodiment, the reaction is carried out for at least 12 hours, preferably 12-60 hours, 18-54 hours, 20-48 hours, 22-36 hours, or about 24 hours. The hydrothermal reaction results in a suspension including hydrochar and CQDs. The CQDs containing suspension may be a homogeneous solution, a heterogenous solution, and the like.

In an embodiment, the autoclave may be stainless-steel, nickel-clad, and a combination thereof. In an embodiment, the autoclave is a stainless-steel Teflon-lined autoclave. In a hydrothermal reaction, an aqueous mixture of precursors (macroalgae in ethanol) is heated in a sealed stainless-steel autoclave above the boiling point of ethanol (150° C. to 250° C., preferably 160 to 200° C., most preferably 170-190° C., and yet more preferably 180° C.), and consequently, the pressure within the reaction autoclave is dramatically increased above atmospheric pressure. This synergistic effect of high temperature and pressure with a carbon source provides a one-step process to produce highly crystalline materials without the need for post-annealing treatments.

Marine species biomass, such as macroalgae or seaweed, is a rich source of carbon material that can be used as a precursor for preparing the CQDs. Seaweeds are a primitive type of plant and macroalgae that usually grow in the regions of backwaters, estuaries, and seas, especially in shallow water. They are typically formed, attached, and visualized to coral reefs, rocks, and other substrata wherever available. The macroalgae may be one or more of red algae, brown algae, or green algae.

Red algae or Rhodophyta comprises one of the largest phyla of algae, containing over 7,000 currently recognized species. The majority of species (6,793) are found in the Florideophyceae (class), and mostly consist of multicellular, marine algae, including many notable seaweeds. Red algae are abundant in marine habitats but relatively rare in freshwaters. The red algae form a distinct group characterized by having eukaryotic cells without flagella and centrioles, chloroplasts that lack external endoplasmic reticulum and contain unstacked (stroma) thylakoids, and use phycobiliproteins as accessory pigments, which give them their red color. Most red algae are also multicellular, macroscopic, marine, and reproduce sexually.

Brown algae or Phaeophyceae include many seaweeds such as kelp and sargassum. Brown algae are all multicellular algae. Many brown algae, such as members of the order Fucales, commonly grow along rocky seashores. Most brown algae live in marine environments, where they play an important role both as food and as a potential habitat and some members of the class, such as kelps, are used by humans as food. In a preferred embodiment, the macroalgae is *Sargassum boveanum*.

Green algae are a group of chlorophyll-containing autotrophic eukaryotes including the phylum Prasinodermophyta. There are about 22,000 species of green algae, many of which live most of their lives as single cells, while other species form coenobia (colonies), long filaments, or highly differentiated macroscopic seaweeds. In a preferred embodiment, the macroalgae is brown algae.

The seaweeds, after collecting from water, are dried out, preferably at a temperature of 50-100° C., preferably 60-90° C., preferably 70-80° C., preferably 70° C. before reacting the seaweeds in ethanol. The drying may be carried under the sun for 6-24 hours, preferably 8-22 hours, 10-20 hours, 12-18 hours, or 14-16 hours for complete evaporation of water. In some embodiments, the seaweeds may be air-dried before reacting the seaweeds in ethanol. After drying, the dried seaweeds may be ground using a mortar and pestle/a mixer/a grinder to obtain a powder. The powder may be dissolved and/or suspended in an appropriate amount of water for further processing. The water may be deionized water (DIW), distilled water, double distilled water, etc. In an embodiment, water is DIW. The ratio of the DIW to the powder is in a range of 5:1 to 75:1, preferably 6:1 to 50:1, preferably 7:1 to 30:1, preferably 8:1 to 20:1, preferably 9:1 to 15:1, preferably 10:1. After washing, the powdered form of the seaweeds are mixed with ethanol in a weight-by-volume ratio of 1:10 to 01:1, preferably 1:7 to 7:1, preferably 1:5 to 5:1, preferably 1:4 to 4:1. In some embodiments, the macroalgae may be mixed with another solvent alone or in combination with ethanol—for example, methanol, isopropanol, etc.

Macroaglae-derived CQDs are elementally doped by nature, meaning that extra doping steps are unnecessary. Thus, additional doping can be used to improve the performance of the CQDs, and the optoelectrical properties can be tuned by controlling the synthesis parameters or dopant content. One of the ordinary skills in the art would recognize that a doping source could be added to the mixture in order to dope such elements into the CQDs. For example, an additional element such as aluminum, antimony, arsenic, barium, beryllium, bismuth, boron, bromine, cadmium, carbon, cerium, cesium, chromium, cobalt, copper, fluorine, gadolinium, gallium, germanium, gold, holmium, indium, iodine, iridium, iron, lanthanum, lead, lithium, manganese, mercury, molybdenum, neodymium, nickel, niobium, nitrogen, osmium, palladium, phosphorus, platinum, praseodymium, promethium, radium, rhenium, rhodium, rubidium, ruthenium, scandium, selenium, silicon, silver, strontium, sulfur, tantalum, technetium, tellurium, terbium, thallium, tin, titanium, tungsten, uranium, vanadium, ytterbium, yttrium, zinc, and zirconium, could be doped into the CQDs.

In some embodiments, the element is nitrogen. In an embodiment, the nitrogen source includes an amine ($N-R^1R^2R^3$, where $R^1$-$R^3$ are the same or different and are any group). Suitable examples include but are not limited to, ethylenediamine, melamine, urea, and ammonia. In a preferred embodiment, the nitrogen source is a polymer containing nitrogen. Suitable examples include but are not limited to polyethyleneimine, chitosan, polylysine, polyacrylamide, poly(ethylene glycol) bis(amine), polyamides, polyurethanes, and polyureas.

Polyethyleneimine is a polymer with repeating units composed of the amine group and two carbon aliphatic $CH_2CH_2$ spacers. Linear polyethyleneimines contain all secondary amines, in contrast to branched PEIs which contain primary, secondary and tertiary amino groups. In an embodiment, the nitrogen source is a polyethyleneimine with an average molecular weight of 10,000-200,000, preferably 20,000, 30,000, 40,000, 50,000, 60,000, 70,000, 80,000, 90,000, 100,000, 110,000, 120,000, 130,000, 140,000, 150,000, 160,000, 170,000, 180,000, or about 190,000. In a most preferred embodiment, the nitrogen source is a branched polyethyleneimine with an average molecular weight of 20,000-30,000.

At step 54, method 50 includes separating the carbon quantum dot from the suspension to obtain the CQDs. The separation may be carried out by centrifugation and/or filtration. As used herein, the term 'centrifugation' refers to a mechanical process that involves using centrifugal force to separate particles from a solution according to their size, shape, density, medium viscosity, and rotor speed. The centrifugation is carried out using a centrifuge, as would be known to a person skilled in the art. After centrifugation, the suspension is filtered to obtain the CQDs. For example, the suspension is filtered using a syringe filter of a pore size of 0.22 micrometers (m).

The CQDs may exist in various morphological shapes, such as nanospheres, nanowires, nanocrystals, nanosheets, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof. In a preferred embodiment, the CQDs have polygonal shape. In some embodiments, the polygonal shape has 3-10 sides, preferably 4-9 sides, 5-8 sides, or 6-7 sides. In a preferred embodiment, the CQDs have a cubic shape (4 sides).

The CQDs have a size of about 1 to 5 nanometers (nm), preferably 2-4 nm, preferably 2-3 nm. In some embodiments, the size distribution of the CQDs does not vary more than about 20%, preferably 15%, 10%, 5%, or about 1%.

In some embodiments, the CQDs include C, Si, Cl, O, K, and Na. In some embodiments, the CQDs include about 50-60 wt. % C, preferably 51-59 wt. %, preferably 52-58 wt. %, preferably 53-57 wt. %, preferably 54-56 wt. %, preferably 54-55 wt. %, preferably 54.6 wt. % C; 15-25 wt. % Si, 16-24 wt. %, preferably 17-23 wt. %, preferably 18-22 wt. %, preferably 19-21 wt. %, preferably 20-21 wt. %, preferably 20.8 wt. % Si; 5-15 wt. % Cl, preferably 6-14 wt. %, preferably 6-12 wt. %, preferably 6-10 wt. %, preferably 7-10 wt. %, preferably 7-9 wt. %, preferably 7-8 wt. %, preferably 7.6 wt. %; 5-15 wt. %, preferably 6-14 wt. %, preferably 6-12 wt. %, preferably 6-10 wt. %, preferably 6-8 wt. %, preferably 7-8 wt. %, preferably 7.6 wt. % 0; 5-15 wt. % K, preferably 6-14 wt. %, preferably 6-12 wt. %, preferably 6-10 wt. %, preferably 6-8 wt. %, preferably 6-7 wt. %, preferably 6.3 wt. % K; and 1-5 wt. % Na, preferably 1-4 wt. %, preferably 1-3 wt. %, preferably 1-2 wt. %, preferably 1.7 wt. % Na based on the total weight of the carbon quantum dots.

In some embodiments, the CQDs have hydroxyl groups on a surface. In some embodiments, the CQDs have chloride or potassium groups on a surface. In some embodiments, the hydroxyl groups on the surface of the CQDs can be reacted with a group to functionalize the surface of the CQDs. In some embodiments, the surface of the CQDs is functionalized with a silicon alkoxide which are a group of alkoxides with the formula $Si(OR)_4$ where R is the same or different among the 4 R's and is any group, such as but not limited to hydrogen, an optionally substituted alkyl group having 1-20 carbons, preferably 2-18 carbon, 4-16 carbons, 6-14 carbons, 8-12 carbons or about 10 carbons, an optionally substituted aromatic group having 1-20 carbons, preferably 2-18 carbon, 4-16 carbons, 6-14 carbons, 8-12 carbons or about 10 carbons or an ethylene glycol group. In some embodiments, the hydroxyl groups are capable of undergoing hydrogen bonding with an additional molecule such as a dye which is capable of altering the absorption and photoluminescence properties, such as but not limited to acidic dyes, basic dyes, azoic dyes, nitro dyes, vat dyes, mordant dyes, and sulfur dyes.

In some embodiments, the CQDs have a bandgap of 2.5-3.0 eV, preferably about 2.5 eV, about 2.6 eV, 2.7 eV, about 2.8 eV, and about 2.9 eV, about 3.0 eV, and most preferably about 2.675 eV. The bandgap is the distance between the valence band of electrons and the conduction band of the CQDs.

In some embodiments, the CQDs are on a substrate. In some embodiments, the substrate is made of silicon. In some embodiments, the CQDs are aggregated on the substrate. In some embodiments, the CQDs are not aggregated on a surface of the substrate. In some embodiments, the CQDs have a height of 0.1-1.0 nm, preferably 0.2-0.8 nm, preferably 0.4-0.7 nm, preferably 0.5-0.6 nm, preferably 0.59 nm on the substrate.

In some embodiments, the CQDs have a UV-visible absorption signal at about 250 to 500 nm wavelength range, preferably 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, about 410 nm, about 420 nm, about 430 nm, about 440 nm, about 450 nm, about 460 nm, about 470 nm, about 480 nm, about 490 nm wavelength, and about 500 nm wavelength. In a preferred embodiment, the CQDs have a UV-visible absorption signal at about 270 to 410 nm wavelength range in order to undergo excitation in this range.

In some embodiments, the UV-visible absorption signal includes, in a deconvoluted spectrum, a first peak from 290 to 320 nm, about 290 nm, about 300 nm, about 310 nm, and about 320 nm; a second peak of about 250 to 400 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm; a third peak from 290 to 430 nm, preferably 290 nm, about 300 nm, about 310 nm, about 320 nm, about 330 nm, about 340 nm, about 350 nm, about 360 nm, about 370 nm, about 380 nm, about 390 nm, about 400 nm, about 410 nm, about 420 nm, about 430 nm; and a fourth peak of about 375-500 nm, about 380 nm, about 390 nm, about 400 nm, about 410 nm, about 420 nm, about 430 nm, about 440 nm, about 450 nm, about 460 nm, about 470 nm, about 480 nm, about 490 nm, about 500 nm in a deconvoluted spectrum of the absorption spectrum.

In some embodiments, the CQDs have a photoluminescence signal at about 350 to 740 nm, about 350 nm, about 400 nm, about 450 nm, about 500 nm, about 550 nm, about 600 nm, about 650 nm, about 700 nm, about 740 nm at an excitation wavelength of 270 to 410 nm, preferably at about 270 nm, about 300 nm, about 320 nm, about 340 nm, about 360 nm, about 380 nm, about 400 nm, about 410 nm. In some embodiments, the CQDs have a photoluminescence signal at about 440 to 660 nm at an excitation wavelength of 270 to 410 nm, preferably at about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, or about 410 nm.

The photoluminescence signal includes a first peak, a second peak, and a third peak in a spectrum that is not deconvoluted, i.e., a full spectrum. The first peak is observed between 440 to 495 nm; the second peak is observed at about 600 nm, and the third peak is observed between 650-660 nm, at an excitation wavelength of 270 to 410 nm, preferably at about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, or about 410 nm. In some embodiments, the first peak shifts 40-50 nm, preferably 42-48 nm, or 44-46 nm, following excitation at 410 nm compared to excitation at 270 nm. In some embodiments, the position of the second peak and the third peak remains at a constant position following excitation at 410 nm compared to excitation at 270 nm. In some embodiments, the CQDs have surface defects which causes the shift of the first peak.

The CQDs of the present disclosure have a Stokes shift of at least 80 nm at an excitation wavelength of 270-410 nm. The stokes shift of the first peak is defined as the positional shift of the first peak in the PL spectrum relative to the excitation wavelength. The stokes shift of the second peak is defined as the positional shift of the second peak in the PL spectrum relative to the excitation wavelength. The stokes shift of the third peak is defined as the positional shift of the third peak in the PL spectrum relative to the excitation wavelength. The stokes shift is relative to a non-deconvoluted spectrum.

In some embodiments, the first peak has a stokes shift of 80-180 nm, preferably 90-170 nm, 100-160 nm, 110-150 nm, 120-140 nm, or about 130 nm following excitation at 270 to 410 nm. In some embodiments, the second peak has a stokes shift of 180-331 nm, preferably 190-320 nm, 200-310 nm, 210-300 nm, 220-290 nm, 230-280 nm, 240-270 nm, or 250-260 nm following excitation at 270 to 410 nm. In some embodiments, the third peak has a stokes shift of 240-390 nm, preferably 250-380 nm, preferably 260-370 nm, 270-360 nm, 280-350 nm, 290-340 nm, 300-330 nm, or about 310-320 nm following excitation at 270 to 410 nm.

In some embodiments, the photoluminescence signal in a deconvoluted spectrum comprises a first peak from 425 to 475 nm, about 430 nm, about 435 nm, about 440 nm, about 445 nm, about 450 nm, about 455 nm, about 460 nm, about 465 nm, about 470 nm; a second peak from 350 to 740 nm, about 400 nm, about 450 nm, about 500 nm, about 550 nm, about 600 nm, about 650 nm, about 700 nm, about 740 nm; a third peak from 500 to 580 nm, about 500 nm, about 510 nm, about 520 nm, about 530 nm, about 540 nm, about 550 nm, about 560 nm, about 570 nm, about 580 nm; a fourth peak from 525 to 600 nm, about 525 nm, about 530 nm, about 535 nm, about 540 nm, about 545 nm, about 550 nm, about 555 nm, about 560 nm, about 565 nm, about 570 nm, about 575 nm, about 580 nm, about 585 nm, about 590 nm, about 595 nm, about 600 nm; a fifth peak from 550 to 650 nm, about 550 nm, about 560 nm, about 570 nm, about 580 nm, about 590 nm, about 600 nm, about 610 nm, about 620 nm, about 630 nm, about 640 nm, about 650 nm; and a sixth peak from 620 to 700 nm about 630 nm, about 640 nm, about 650 nm, about 660 nm, about 670 nm, about 680 nm, about 690 nm, about 700 nm, in a deconvoluted spectrum at an excitation wavelength of 270 to 410 nm, preferably at about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, or about 410 nm.

The second peak has an area at least 10 times larger, preferably 10-20 times, 11 times, 12 times, 13 times, 14 times, 15 times, 16 times, 17 times, 18 times, 19 times, or 20 times than the first, third, fourth, fifth, or sixth peaks.

EXAMPLES

The following details of the examples demonstrate a method for synthesizing carbon quantum dots (CQDs) as described herein. The examples are provided solely for illustration and are not to be construed as limitations of the present disclosure, as many variations thereof are possible without departing from the spirit and scope of the present disclosure.

Example 1: Synthesis of CQDs

The seaweeds (*Sargassum boveanum* macroalgae) were collected from the coastal water of the Arabian Gulf Marine species biomass (macroalgae) was dried naturally before being ground into powder. After being washed in deionized water, the powdered material was dried in an oven at 70 degrees Celsius (° C.). 100 grams (g) of the powder was then dispersed in 30 milliliters (mL) of ethanol. This dispersed mixture was then put into a stainless steel-lined Teflon autoclave with a volume of about 50 mL. At a reaction temperature of 180° C., the hydrothermal reaction was carried out for a whole day. Following natural cooling, a suspension of CQDs was recovered from the hydrochar by centrifugation. The suspension was then filtered using a syringe filter with a 0.22 micrometers (m) pore size.

Example 2: Characterization

Using a Smart iTR NICOLET iS10 instrument, Fourier-transform infrared (FTIR; Smart iTR NICOLET iS10, manufactured by Thermo Fisher Scientific, Waltham, Massachusetts, United States) spectra were investigated at room temperature over the wavenumber range of 400-4000-centimeter inverse ($cm^1$). The field-emission scanning electron microscopy (FESEM) images of the CQDs were obtained using a JEOL SEM JSM6610LV, Japan. The absorption spectra were obtained using UV-Vis-spectroscopy (JASCO UV-Vis-NIR spectrometer; Model: V-670, Japan). The high-resolution morphology and size of the CQDs were obtained using transmission electron microscopy (JEOL; Model: JEM2100F, Japan). Photoluminescence (PL) spectra were obtained using PL spectroscopy (FluoroLog-Modular Spectrofluorometer, Horiba Scientific, Japan). The height of the CQDs was determined using an atomic force microscope (Agilent 5500, manufactured by Agilent, California, United States).

Example 3: Structural and Bonding Properties

Figure 1B:
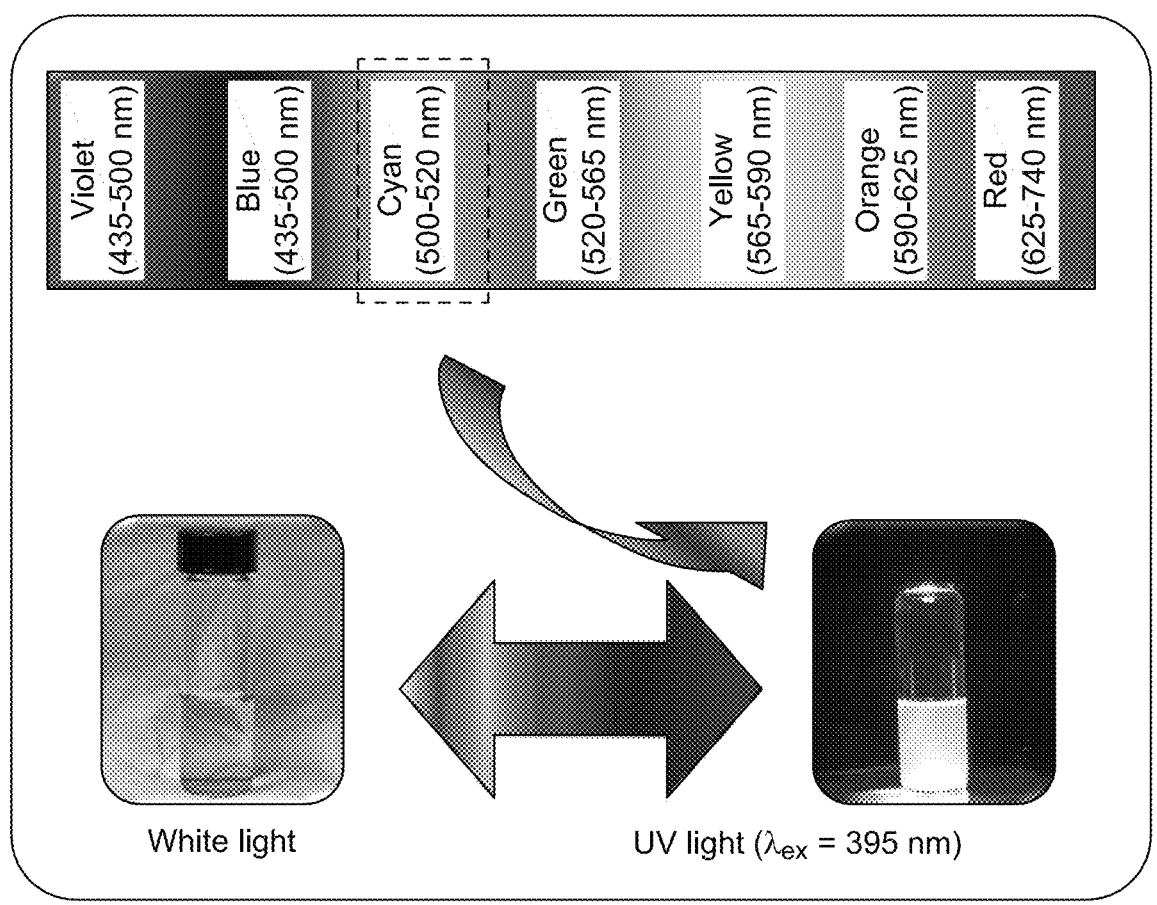
FIG. 1B depicts optical images of the CQDs in white light and in ultraviolet (UV) light, according to certain embodiments.

FIG. 1B shows optical photographs of CQDs dissolved in ethanol in white light and UV light. The image shows the optical image in white light. However, when illuminated with UV light of a wavelength of 395 nm, the color of the emitted light changes to cyan. An excitation wavelength of 395 nm corresponds to an emission wavelength between 500 nm and 520 nm.

Figure 2A:
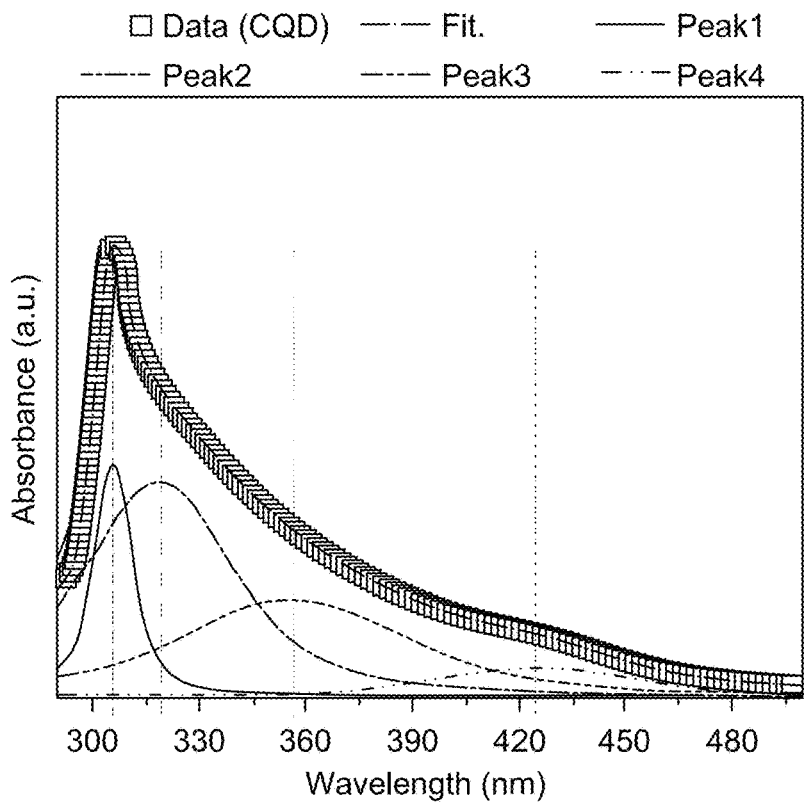
FIG. 2A shows an absorption spectrum and a deconvoluted absorption spectrum for the CQDs, according to certain embodiments.
Figure 2B:
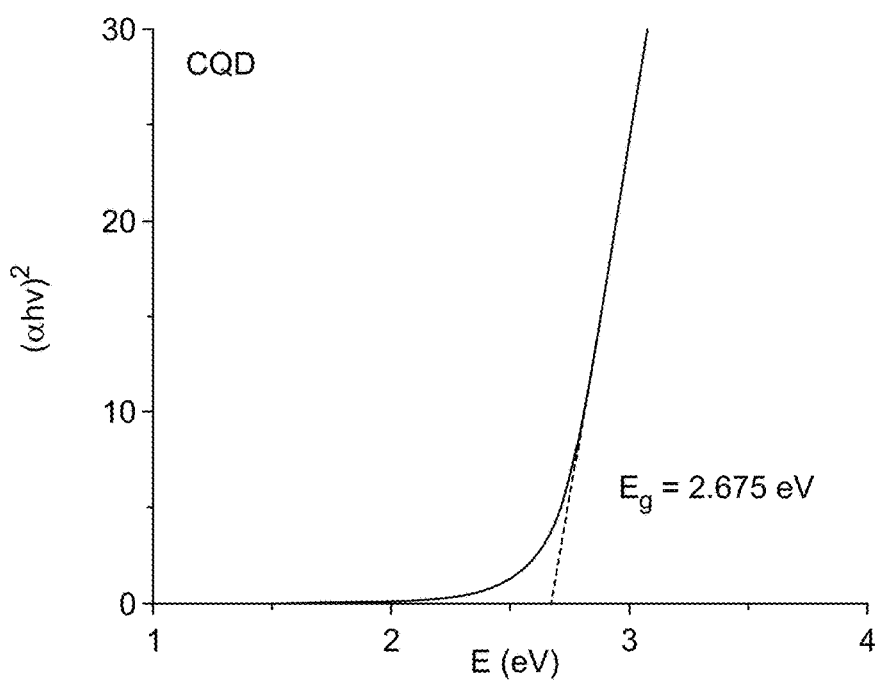
FIG. 2B is a Tauc's plot for determination of bandgap of CQDs, according to certain embodiments.

The absorption spectra of CQDs are shown in FIG. 2A. The absorption peak is deconvoluted in four sub-peaks that are positioned at 305.5 nm (peak 1), 319.5 nm (peak 2), 356.5 nm (peak 3), and 425.1 nm (peak 4). The absorption data was also used for the Tauc plot for the determination of the optical bandgap ($E_g$) of the CQDs, as shown in FIG. 2B. The obtained $E_g$ value is 2.675 eV.

Figure 3A:
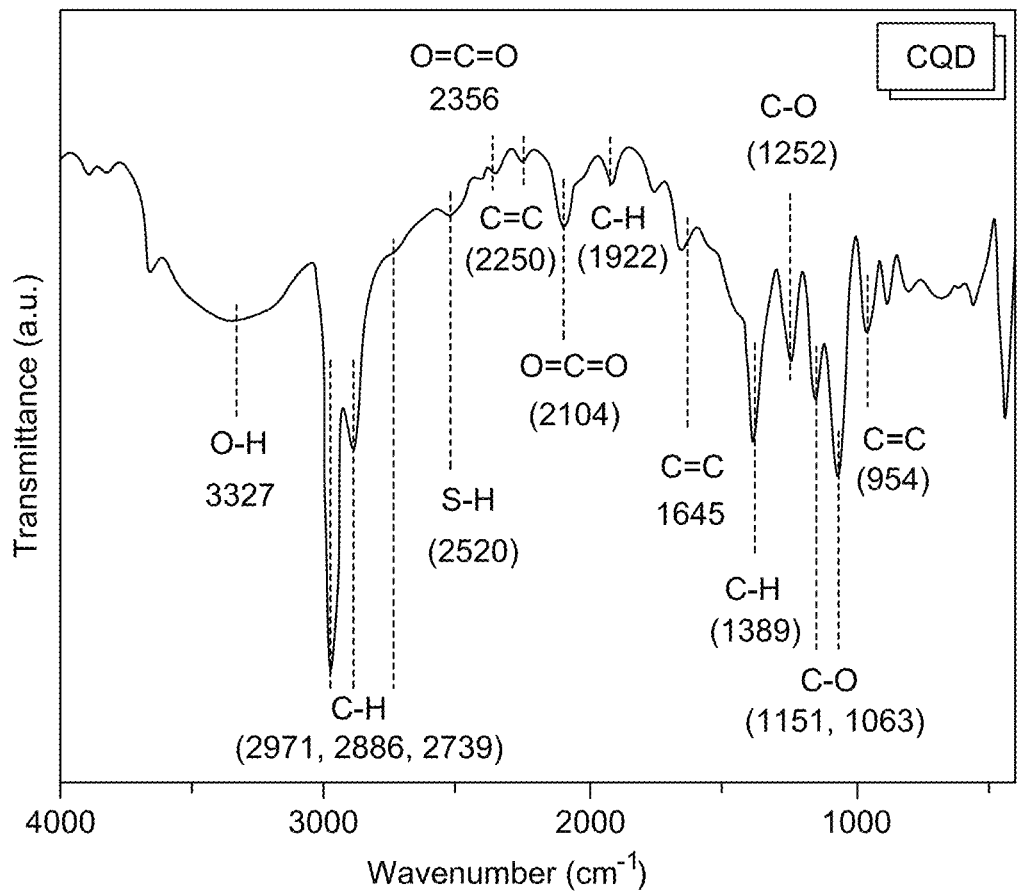
FIG. 3A shows Fourier-transform infrared (FTIR) spectra of the CQDs, according to certain embodiments.
Figure 3B:
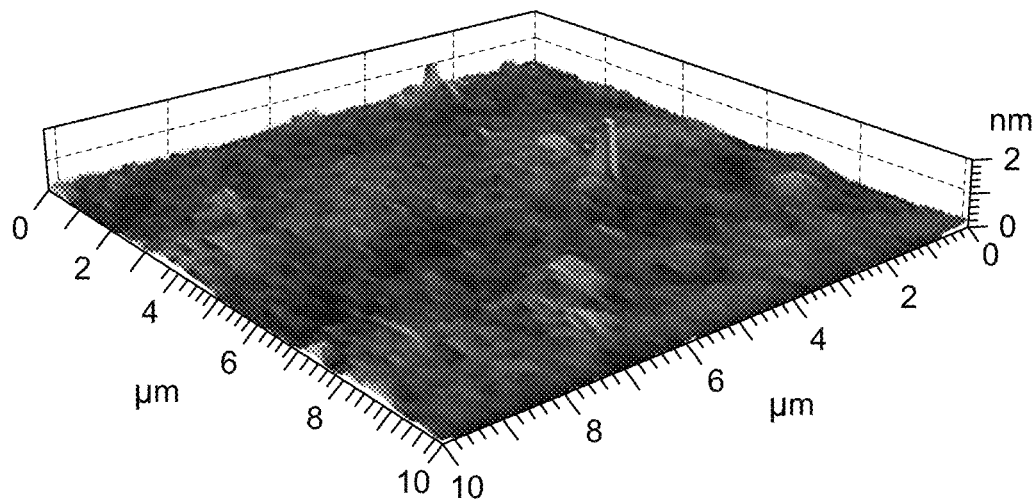
FIG. 3B depicts an atomic force microscopy (AFM) image of CQDs, according to certain embodiments.

Furthermore, bonding analysis was performed to establish moieties' doping. The FTIR transmittance spectrum of CQD samples is depicted in FIG. 3A. FTIR transmission spectra were acquired in order to do the bonding analysis on the synthesized CQDs. The stretching vibration of O—H is linked to a massive absorption band at 3327 $cm^{-1}$, while the absorption peaks at 2104 cm-1 and 2356 $cm^{-1}$ are allied to C=O=C, the peaks at 954 $cm^{-1}$ and 1645 $cm^{-1}$ are linked to C=O bonding. The bond signature of C—O is obtained at 1063 $cm^{-1}$ and 1151 $cm^{-1}$. The absorption peaks at 1389 $cm^{-1}$ and 1922 $cm^{-1}$ are associated with C—H bonding. Atomic force microscopy (AFM) is used to study the surface morphology of the CQD layer. FIG. 3B shows the AFM image of CQDs. The average height of the CQD layer coated on a polished silicon surface is 0.59 nm. However, some of the CQDs show larger heights due to agglomeration.

Figure 4:
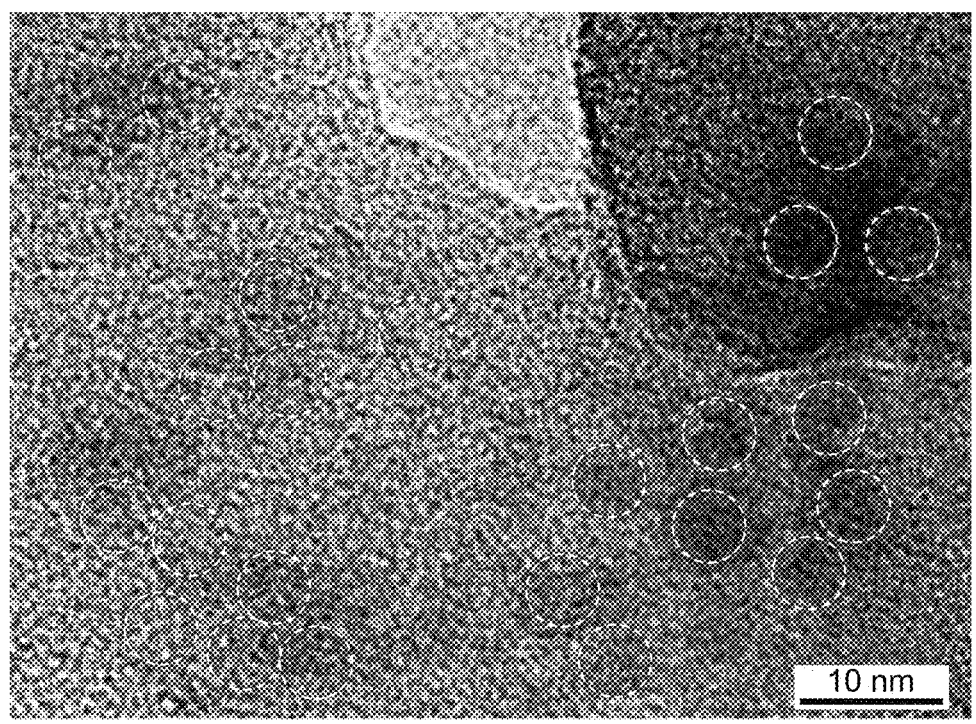
FIG. 4 shows a transmission electron microscopy (TEM) image of the CQDs, according to certain embodiments.
Figure 5A:
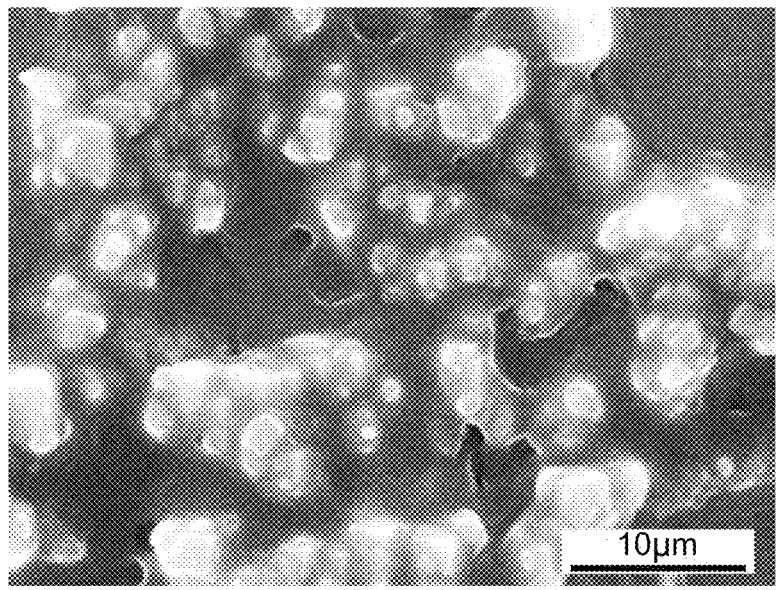
FIG. 5A shows a scanning electron microscopy (SEM) image of the CQDs, according to certain embodiments.

The size of the CQDs is further determined by transmission electron microscopy (TEM), as shown in FIG. 4. The diameter of the CQDs lies between a range of about 2 nm to 3 nm. The scanning electron microscopy (SEM) images along with EDS elemental mapping are also obtained to examine the elemental distribution. The SEM image of the CQDs is illustrated in FIG. 5A. It creates a uniform layer on the substrate, which is an indication of good coordination among the CQDs.

Figure 5B:
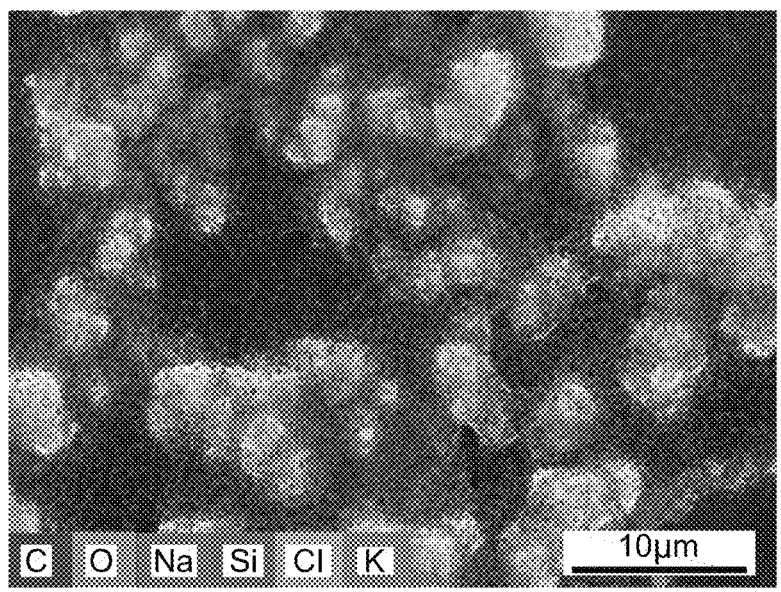
FIG. 5B shows energy dispersive X-ray spectroscopy (EDS) elemental mapping of the CQDs, according to certain embodiments.
Figure 5C:
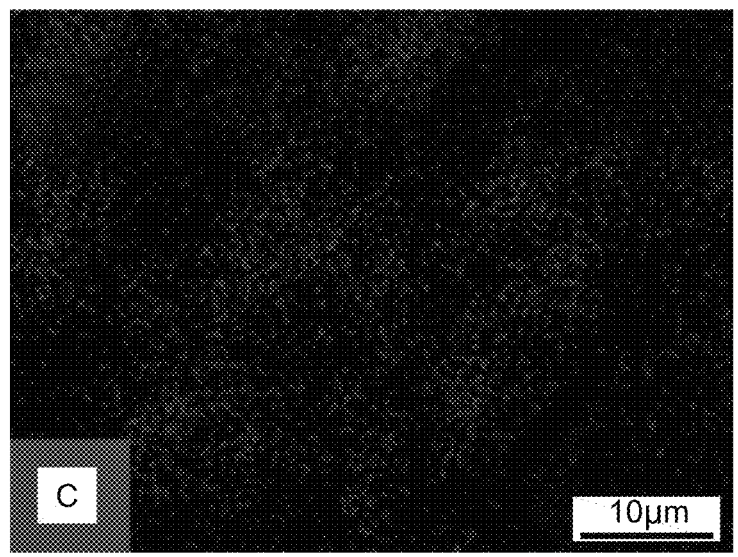
FIG. 5C shows EDS elemental mapping of the CQDs, depicting carbon (C), according to certain embodiments.
Figure 5D:
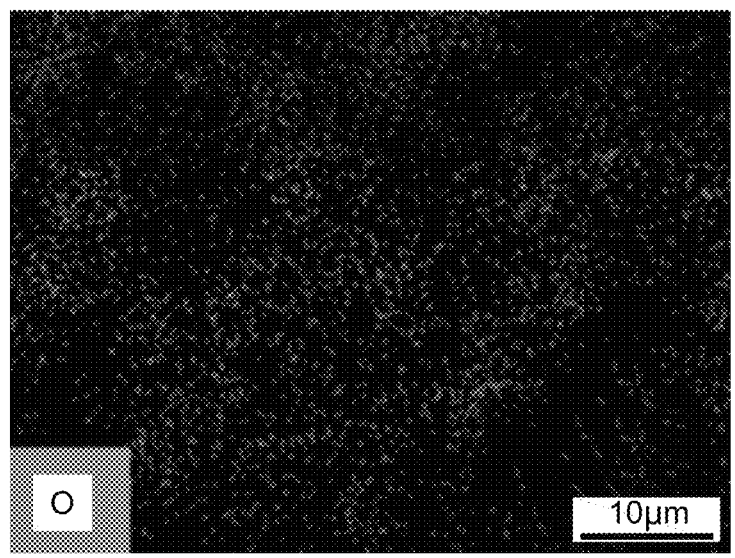
FIG. 5D shows EDS elemental mapping of the CQDs, depicting oxygen (O), according to certain embodiments.
Figure 5E:
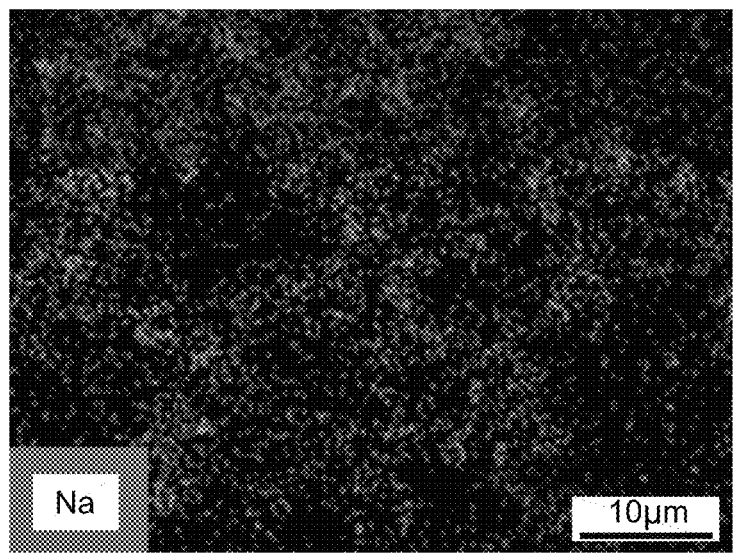
FIG. 5E shows EDS elemental mapping of the CQDs, depicting sodium (Na), according to certain embodiments.
Figure 5F:
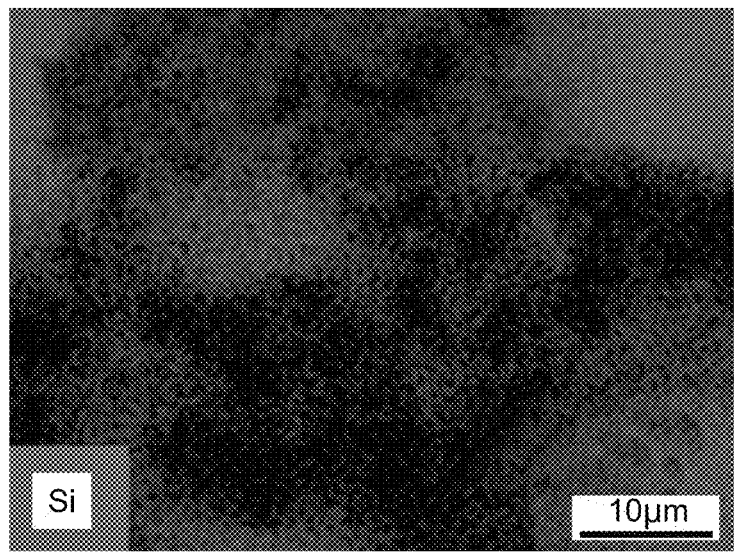
FIG. 5F shows EDS elemental mapping of the CQDs, depicting silicon (Si), according to certain embodiments.
Figure 5G:
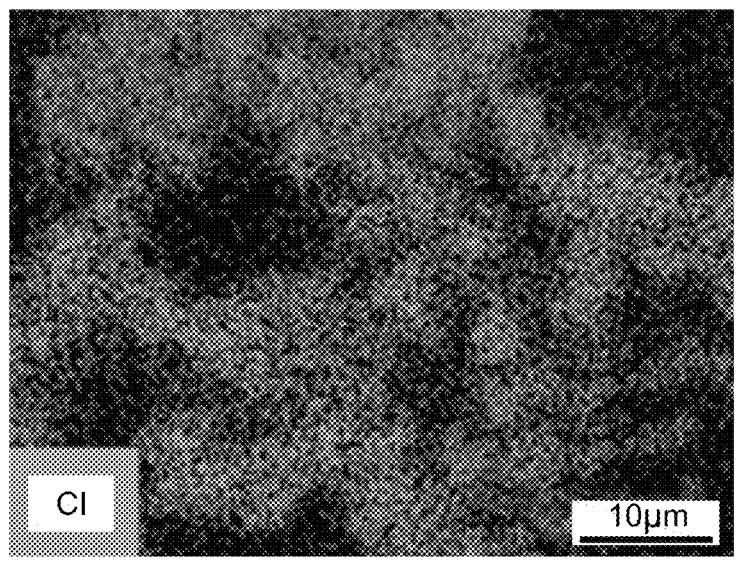
FIG. 5G shows EDS elemental mapping of the CQDs, depicting chlorine (Cl), according to certain embodiments.
Figure 5H:
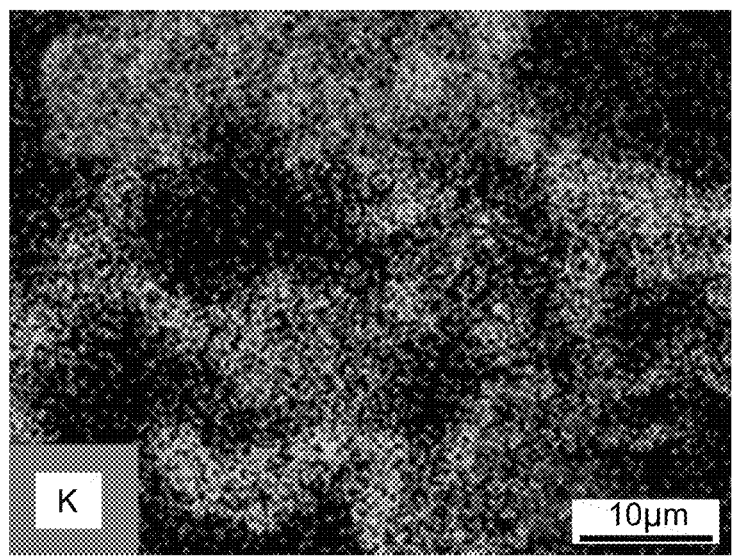
FIG. 5H shows EDS elemental mapping of the CQDs, depicting potassium (K), according to certain embodiments.
Figure 6A:
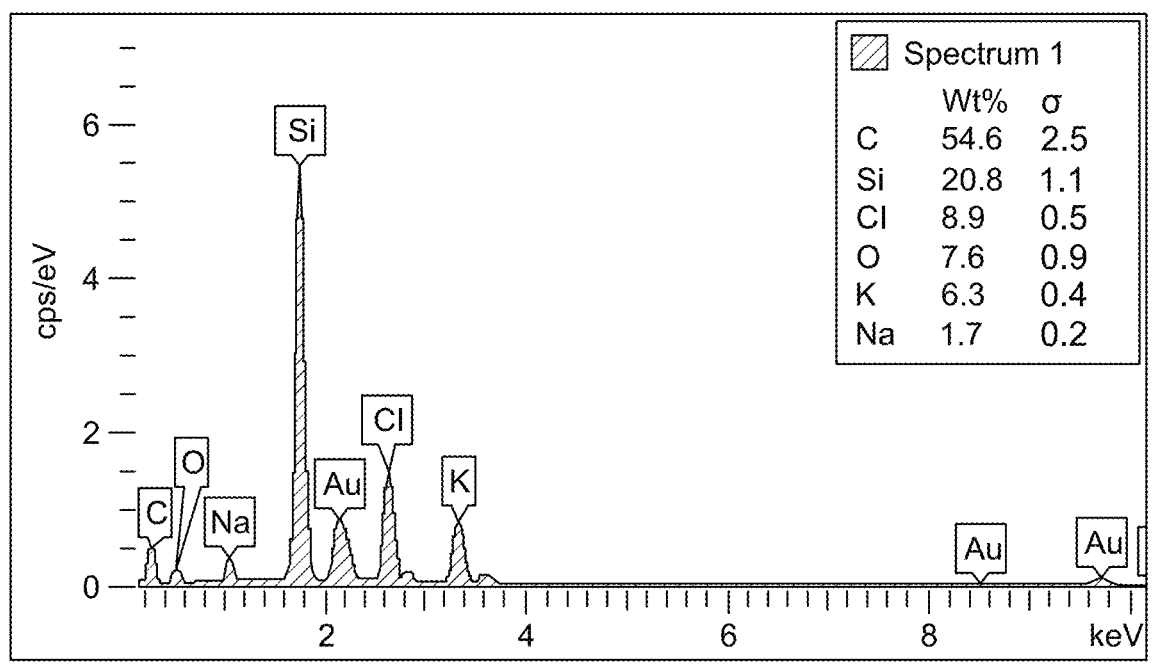
FIG. 6A shows an EDS spectrum for the CQDs, according to certain embodiments.
Figure 6B:
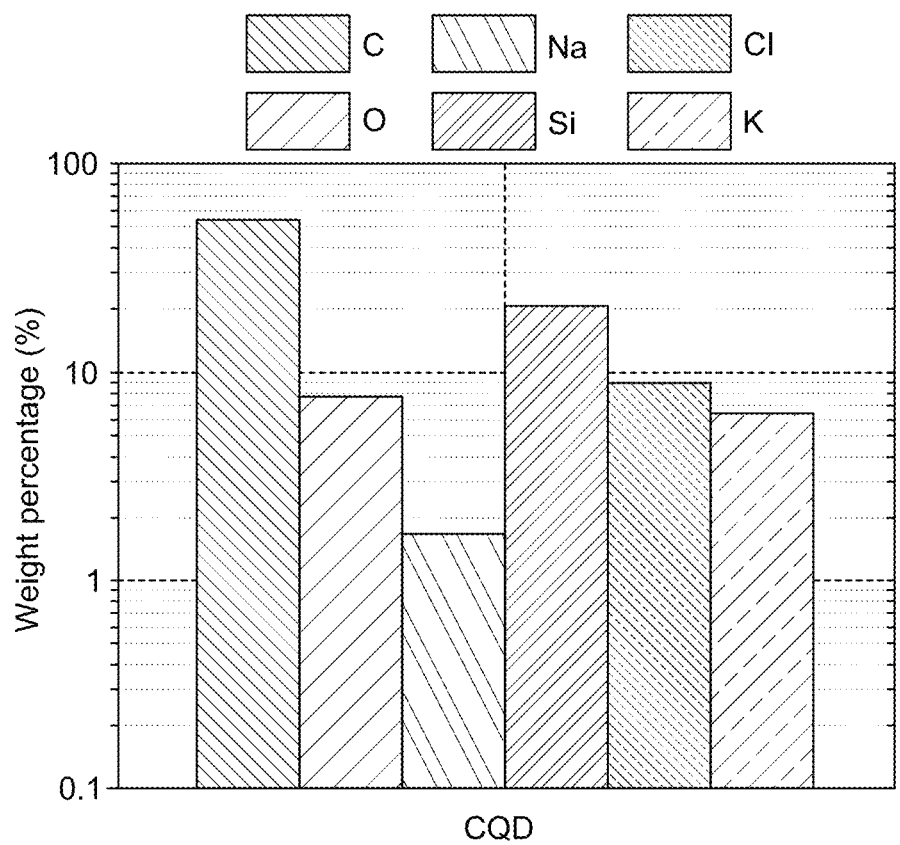
FIG. 6B shows an elemental composition of the CQDs, according to certain embodiments.

Furthermore, the energy dispersive X-ray spectroscopy (EDS) characterization was carried out to inspect the elemental distribution in the CQDs. The EDS of CQD is displayed in FIGS. 5B-5H. It was observed that all the available elements (C, O, Na, Si, Cl, and K) are uniformly distributed over the CQD surface. The EDS spectrum of CQDs is shown in FIG. 6A. The weight percentage of all the elements is depicted in FIG. 5B. As can be seen from FIG. 6B, the element having the highest content in the CQDs is carbon. The obtained C percentage was 54.6 wt. %. The weight percentage of Si, Cl, O, K, and Na are 20.8%, 8.9%, 7.6%, 6.3%, and 1.7%, respectively.

Figure 7A:
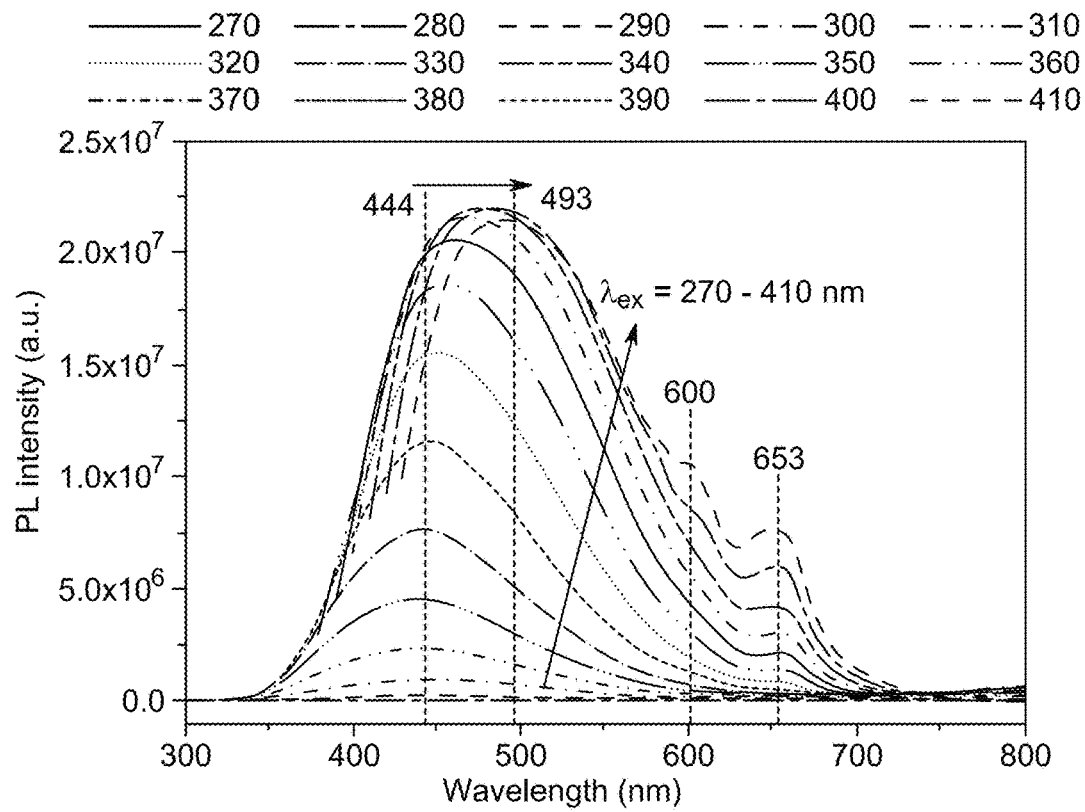
FIG. 7A shows photoluminescence (PL) emission spectra of the CQDs at different excitation wavelengths in the range of 270-410 nm, according to certain embodiments.

The PL spectra of the CQDs are illustrated in FIG. 7A. The used excitation wavelength ($\lambda_{ex}$) range was 270 nm-410 nm. As can be seen from FIG. 7A, a wide emission spectrum was obtained in the wavelength (k) range of 350 nm-740 nm. With the increase in the excitation wavelength from 270 nm-410 nm, the most intense emission peaks shifted from 444 nm-493 nm. This change in the peak position is due to surface defects in the prepared sample. The other two visible peaks (at ~600 nm and ~653 nm) remain fixed on altering the excitation wavelength.

Figure 7B:
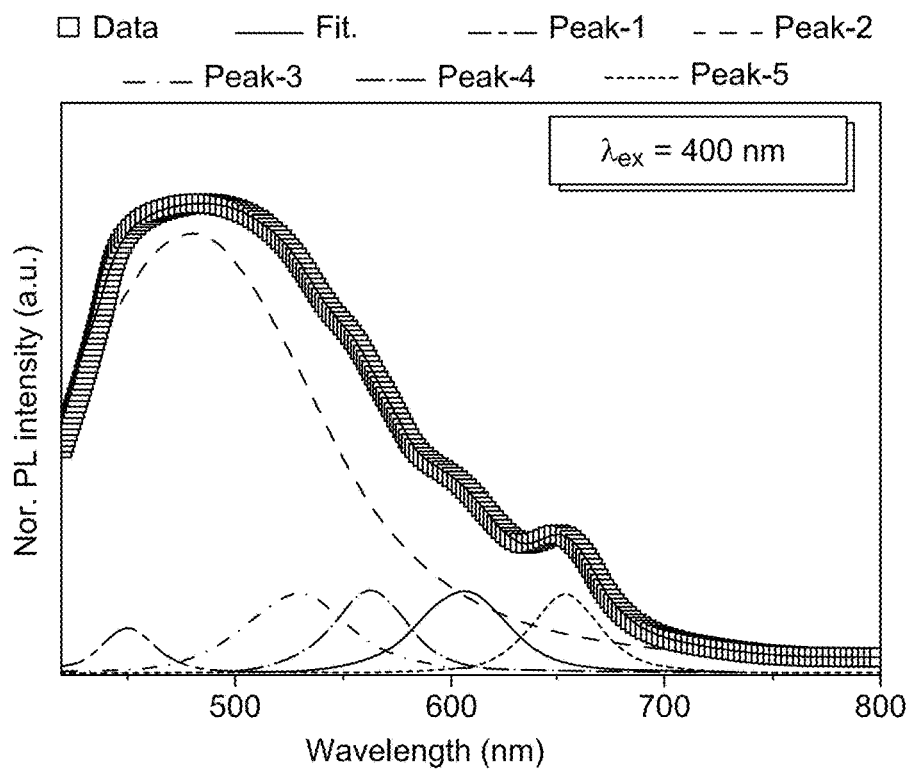
FIG. 7B depicts a PL spectrum and a deconvoluted PL emission spectrum of the CQDs at an excitation wavelength of 400 nanometers (nm), according to certain embodiments.
Figure 7C:
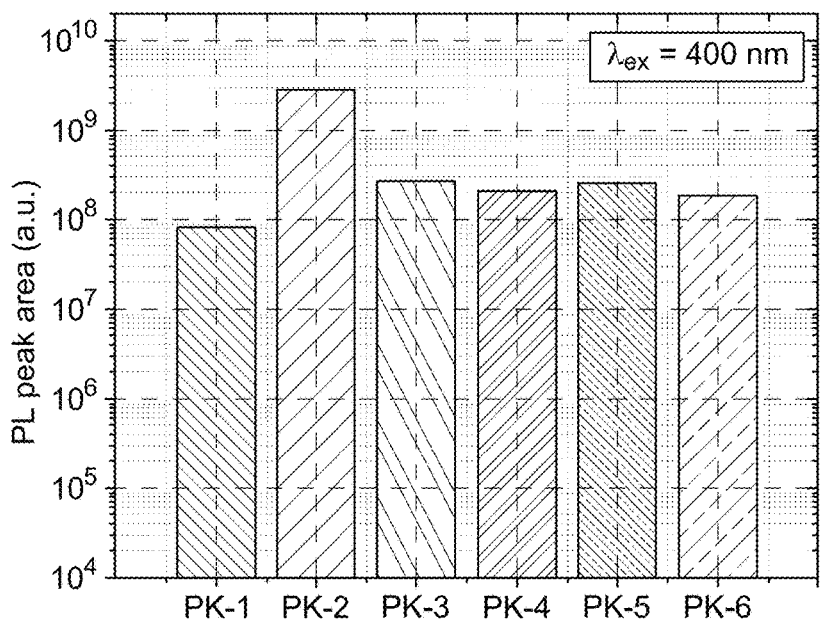
FIG. 7C depicts a comparison of peak area of six peaks (peak-1, peak-2, peak-3, peak-4, peak-5, and peak-6) of the CQDs at an excitation wavelength of 400 nm, according to certain embodiments.
Figure 7D:
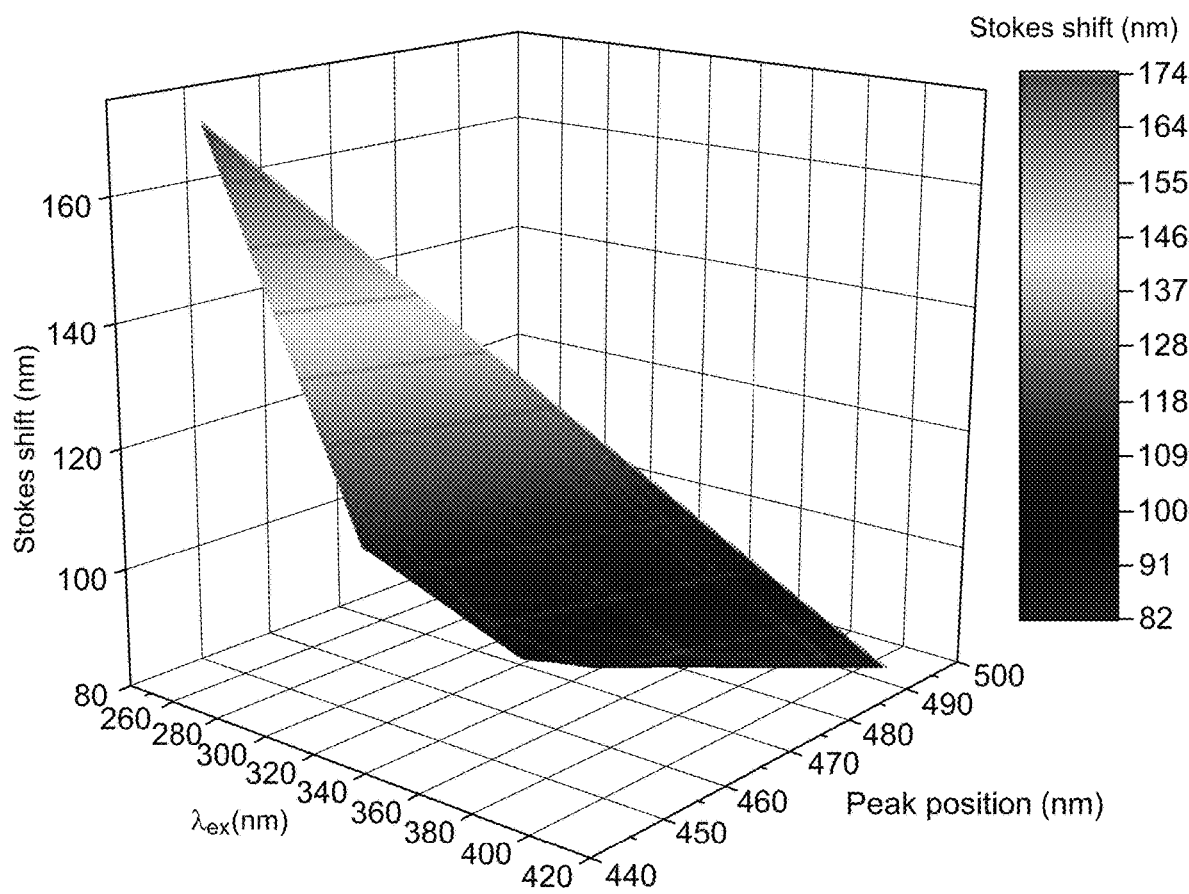
FIG. 7D is a three-dimensional (3D) map showing Stokes shift, peak position, and excitation wavelength of the CQDs, according to certain embodiments.

FIG. 7B depicts the peaks obtained at an excitation wavelength of 400 nm deconvoluted into six sub-peaks (peak-1, peak-2, peak-3, peak-4, peak-5, and peak-6 at 449.5 nm, 479.0 nm, 528.4 nm, 562.5 nm, 605.8 nm, and 653.6 nm, respectively). The PL peak area of the deconvoluted peak is depicted in FIG. 7C. The most intense peak area is obtained for peak-2. The highest Stokes shift (174 nm) is obtained for the excitation wavelength of 270 nm, depicted in FIG. 7D. With increasing the value of excitation wavelength, the Stokes shift decreases and reaches the lowest value of 82 nm for the excitation wavelength of 410 nm. The PL peak positions obtained at various excitation wavelengths are compared in Table 1 with previously reported values in CN107446578A and CN104340965B, incorporated herein by reference in their entirety. Furthermore, the Stokes shift is compared in Table 2 with both of CN107446578A and CN104340965B. In CN107446578A nitrogen doped CQDs and made and CN104340965B CQDs are made with bee pollen.

TABLE 1

Comparison of PL peak position obtained in the present disclosure and the prior art.

| | PL peak position (nm), This work | | | PL peak position (CN104340965(B)) | | | | PL peak position (CN107446578A) | |
|---|---|---|---|---|---|---|---|---|---|
| Excitation λ (nm) | First peak | Second peak | Third peak | Excitation λ (nm) | FIG. 4 | FIG. 9 | FIG. 13 | Excitation λ (nm) | FIG. 4 |
| 270 | 443.05 | 600.5 | 655.0 | — | — | — | — | — | — |
| 280 | 443.05 | 600.5 | 659.0 | — | — | — | — | — | — |
| 290 | 443.05 | 600.5 | 662.0 | | | | | 345 | 472 |
| 300 | 443.07 | 600.5 | 658.0 | | | | | 355 | 474 |
| 310 | 443.07 | 600.5 | 656.0 | | | | | 365 | 475 |
| 320 | 443.07 | 600.5 | 655.0 | | | | | 375 | 477 |
| 330 | 443.07 | 600.5 | 655.4 | | | | | 385 | 480 |
| 340 | 446.38 | 600.5 | 654.0 | 340 | 426.25 | 424.49 | 426.56 | 395 | 482 |
| 350 | 451.62 | 600.5 | 655.0 | — | — | — | — | 405 | 487 |
| 360 | 454.24 | 600.5 | 655.0 | 360 | 436.77 | 433.30 | 436.40 | 415 | 499 |
| 370 | 460.74 | 600.5 | 656.0 | | | | | | |
| 380 | 470.54 | 600.5 | 656.5 | 380 | 446.47 | 443.90 | 448.03 | | |
| 390 | 476.94 | 600.5 | 654.0 | | | | | | |

TABLE 1-continued

Comparison of PL peak position obtained in the present disclosure and the prior art.

| | PL peak position (nm), This work | | | PL peak position (CN104340965(B)) | | | | PL peak position (CN107446578A) | |
|---|---|---|---|---|---|---|---|---|---|
| Excitation λ (nm) | First peak | Second peak | Third peak | Excitation λ (nm) | FIG. 4 | FIG. 9 | FIG. 13 | Excitation λ (nm) | FIG. 4 |
| 400 | 485.46 | 601.0 | 654.0 | 400 | 473.58 | 463.21 | 477.86 | | |
| 410 | 493.80 | 601.2 | 653.0 | | | | | | |

TABLE 2

Comparison of Stokes shift obtained in the present disclosure and the prior art.

| | Stokes shift (nm), This work | | | Stokes shift (CN104340965(B)) | | | | Stokes shift (CN107446578A) | |
|---|---|---|---|---|---|---|---|---|---|
| Excitation λ (nm) | First peak | Second peak | Third peak | Excitation λ (nm) | FIG. 4 | FIG. 9 | FIG. 13 | Excitation λ (nm) | FIG. 4 |
| 270 | 173.05 | 330.5 | 385.0 | — | — | — | — | 345 | 127 |
| 280 | 163.05 | 320.5 | 379.0 | — | — | — | — | 355 | 119 |
| 290 | 153.05 | 310.5 | 372.0 | | | | | 365 | 110 |
| 300 | 143.07 | 300.5 | 358.0 | | | | | 375 | 102 |
| 310 | 133.07 | 290.5 | 346.0 | | | | | 385 | 95 |
| 320 | 123.07 | 280.5 | 335.0 | | | | | 395 | 87 |
| 330 | 113.07 | 270.5 | 325.4 | 420 | 74.55 | 71.78 | 78.45 | 405 | 82 |
| 340 | 106.38 | 260.5 | 314.0 | 340 | 86.25 | 84.49 | 86.56 | 415 | 84 |
| 350 | 101.62 | 250.5 | 305.0 | — | | | | — | — |
| 360 | 94.24 | 240.5 | 295.0 | 360 | 76.77 | 73.30 | 76.40 | — | — |
| 370 | 90.74 | 230.5 | 286.0 | | | | | | |
| 380 | 90.54 | 220.5 | 276.5 | 380 | 66.47 | 63.90 | 68.03 | | |
| 390 | 86.94 | 210.5 | 264.0 | | | | | | |
| 400 | 85.46 | 201.0 | 254.0 | 400 | 73.58 | 63.21 | 77.86 | | |
| 410 | 83.80 | 191.2 | 243.0 | | | | | | |

To summarize, aspects of the present disclosure provide a method of using macroalgae as biomass for synthesizing the CQDs. A detailed examination was also carried out into the use of CQDs as photon downconverters/downshifters in PVs. The diameter of the CQDs varies between 2 nm and 3 nm. The energy-dispersive X-ray spectroscopy (EDS) investigation indicated a C content of 54.6% by weight. Si, Cl, O, K, and Na have the following weight percentages: 20.8%, 8.9%, 7.6%, 6.3%, and 1.7%. The CQDs have an optical bandgap of 2.675 eV. At an excitation wavelength of 270 nm, three prominent peaks with Stokes shifts of 173, 330.5, and 385 nm were observed. However, at an excitation wavelength of 400 nm, the Stokes shift for three successive peaks is 85.5, 201.0, and 254.0 nm.

Numerous modifications and variations of the present disclosure are possible in light of the above teachings. It is therefore to be understood that within the scope of the appended claims, the invention may be practiced otherwise than as specifically described herein.

The invention claimed is:

1. A method for synthesizing carbon quantum dots, comprising:
    reacting a mixture of a macroalgae and ethanol hydrothermally in an autoclave at a reaction temperature in a range of 150 degrees Celsius (° C.) to 250° C. for at least 12 hours to form a suspension; and
    separating the carbon quantum dots from the suspension, wherein the carbon quantum dots have a diameter of 1 to 5 nanometers (nm),
    wherein the carbon quantum dots have a Stokes shift of at least 80 nm at an excitation wavelength of 270-410 nm.
2. The method of claim 1, wherein the macroalgae is red algae, brown algae, or green algae.
3. The method of claim 1, wherein the carbon quantum dots have hydroxyl groups on a surface.
4. The method of claim 1, wherein the carbon quantum dots have a diameter of 2-3 nm.
5. The method of claim 1, wherein the carbon quantum dots comprise 50-60 wt. % C, 15-25 wt. % Si, 5-15 wt. % Cl, 5-15 wt. %, 5-15 wt. % K, and 1-5 wt. % Na, based on a total weight of the carbon quantum dots.
6. The method of claim 1, wherein the carbon quantum dots have an optical band gap of 2.5-3.0 electron volts (eV).
7. The method of claim 1, wherein the carbon quantum dots have a photoluminescence signal in a 350 to 740 nm wavelength range at an excitation wavelength of 270 to 410 nm.
8. The method of claim 7, wherein the photoluminescence signal comprises a first peak, a second peak, and a third peak.
9. The method of claim 8, wherein the first peak shifts 40-50 nm following excitation at 410 nm compared to excitation at 270 nm,
    wherein a position of the second peak and the third peak remains at a constant position following excitation at 410 nm compared to excitation at 270 nm, and
    wherein the carbon quantum dots have surface defects.
10. The method of claim 8, wherein the first peak has a stokes shift of 80-180 nm following excitation at 270 to 410 nm, wherein the second peak has a stokes shift of 180-331 nm following excitation at 270 to 410 nm, and wherein the third peak has a stokes shift of 240-390 nm following excitation at 270 to 410 nm.

11. The method of claim 7, wherein the photoluminescence signal comprises a first peak from 425 to 475 nm, a second peak from 350-740 nm, third peak from 500 to 580 nm, a fourth peak from 525 to 600 nm, a fifth peak from 550-650 nm, and a sixth peak from 620-700 nm in a deconvoluted spectrum.

12. The method of claim 11, wherein the second peak has an area at last 10 times larger than the first, third, fourth, fifth, or sixth peaks.

13. The method of claim 1, wherein the macroalgae is *Sargassum boveanum*.

14. A method for synthesizing carbon quantum dots, comprising:
drying macroalgae at a temperature of 50-100° C.; then
reacting a mixture of the macroalgae and ethanol hydrothermally in an autoclave at a reaction temperature in a range of 150° C. to 250° C. to form a suspension; and
separating the carbon quantum dots from the suspension, wherein the carbon quantum dots have a diameter of 1 to 5 nanometers (nm); and
wherein the carbon quantum dots have a Stokes shift of at least 80 nm at an excitation wavelength of 270-410 nm.

15. A method for synthesizing carbon quantum dots, comprising:
reacting a mixture of macroalgae and ethanol hydrothermally in an autoclave at a reaction temperature in a range of 150 degrees Celsius (° C.) to 250° C. to form a suspension; and
separating the carbon quantum dots from the suspension, wherein the carbon quantum dots have a diameter of 1 to 5 nanometers (nm),
wherein the carbon quantum dots have a Stokes shift of at least 80 nm at an excitation wavelength of 270-410 nm;
wherein the carbon quantum dots have a UV-visible absorption signal in a 250 to 500 nm wavelength range comprising a first peak from 290 to 320 nm, a second peak from 250 to 400 nm, a third peak from 290 to 430 nm, and a fourth peak from 375-500 nm in a deconvoluted spectrum.

* * * * *